(12) United States Patent
Chu

(10) Patent No.: US 11,051,229 B1
(45) Date of Patent: Jun. 29, 2021

(54) COMMUNICATING NETWORK MANAGEMENT PARAMETERS IN A WLAN

(71) Applicant: NXP USA, Inc., Austin, TX (US)

(72) Inventor: Liwen Chu, San Ramon, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/526,823

(22) Filed: Jul. 30, 2019

Related U.S. Application Data

(60) Provisional application No. 62/721,432, filed on Aug. 22, 2018, provisional application No. 62/712,086, filed on Jul. 30, 2018.

(51) Int. Cl.
*H04W 40/24* (2009.01)
*H04W 76/11* (2018.01)
*H04W 80/02* (2009.01)
*H04L 1/16* (2006.01)

(52) U.S. Cl.
CPC ......... *H04W 40/248* (2013.01); *H04L 1/1614* (2013.01); *H04W 40/244* (2013.01); *H04W 76/11* (2018.02); *H04W 80/02* (2013.01)

(58) Field of Classification Search
CPC . H04W 40/248; H04W 76/11; H04W 40/244; H04W 80/02; H04L 1/1614
See application file for complete search history.

(56) References Cited

U.S. PATENT DOCUMENTS

| 7,194,622 | B1 * | 3/2007 | Halasz | H04L 9/0822 |
| | | | | 380/247 |
| 10,237,891 | B1 * | 3/2019 | Chu | H04W 48/16 |
| 10,524,290 | B1 * | 12/2019 | Chu | H04L 27/0006 |
| 10,588,165 | B1 * | 3/2020 | Chu | H04W 74/0816 |
| 10,681,525 | B2 * | 6/2020 | Pinheiro | H04W 48/02 |
| 2013/0094402 | A1 * | 4/2013 | Muhamed | H04W 88/08 |
| | | | | 370/255 |
| 2019/0191470 | A1 * | 6/2019 | Joseph | H04W 8/186 |
| 2020/0314202 | A1 * | 10/2020 | Gordon | H04L 63/102 |

OTHER PUBLICATIONS

U.S. Appl. No. 14/963,045, Chu et al., entitled "Methods and Devices for Determining Channel State," filed Dec. 8, 2015.
(Continued)

*Primary Examiner* — Harry H Kim

(57) ABSTRACT

A physical access point manages a first wireless communication sub-network and one or more second wireless communication sub-networks. The physical access point transmits values of wireless network management parameters for the first wireless communication sub-network to inform one or more client stations of the values of the wireless network management parameters for the first wireless communication sub-network. The access point generates a list of wireless network management parameters for which values are not inherited from the first wireless communication sub-network by any of the one or more second wireless communication sub-networks, and transmits the list to inform the one or more client stations that values of the wireless network management in the list are not inherited from the first wireless communication sub-network by any of the one or more second wireless communication sub-networks.

28 Claims, 8 Drawing Sheets

(56) References Cited

OTHER PUBLICATIONS

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Enginpeers, Inc.*, pp. 1-425 (Dec. 18, 2013).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

Stacey, "Specification Framework for TGax," doc. IEEE 802.11-15/0132r12, vol. 802.11ax, No. 12, 38 pages (Dec. 1, 2015).

\* cited by examiner

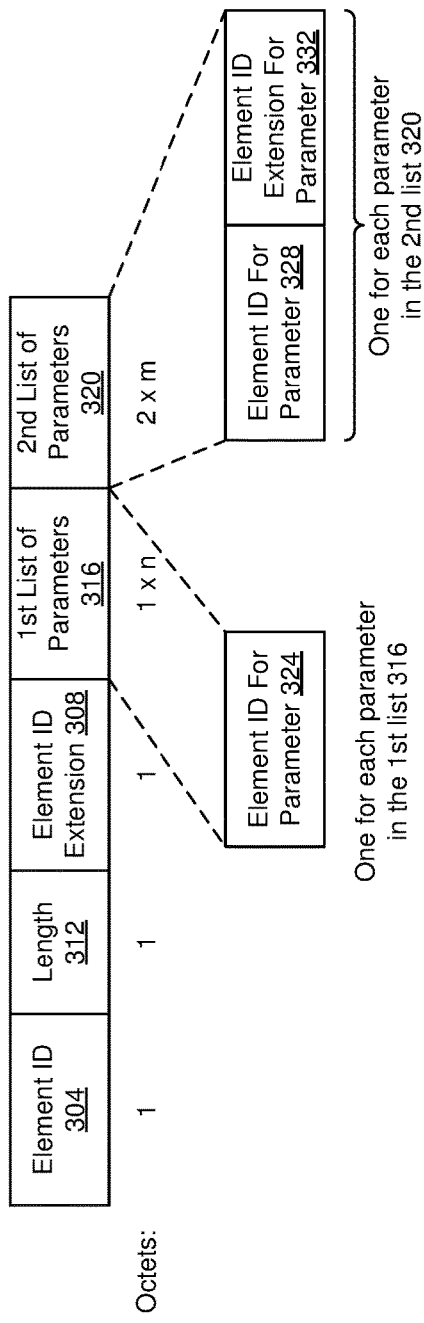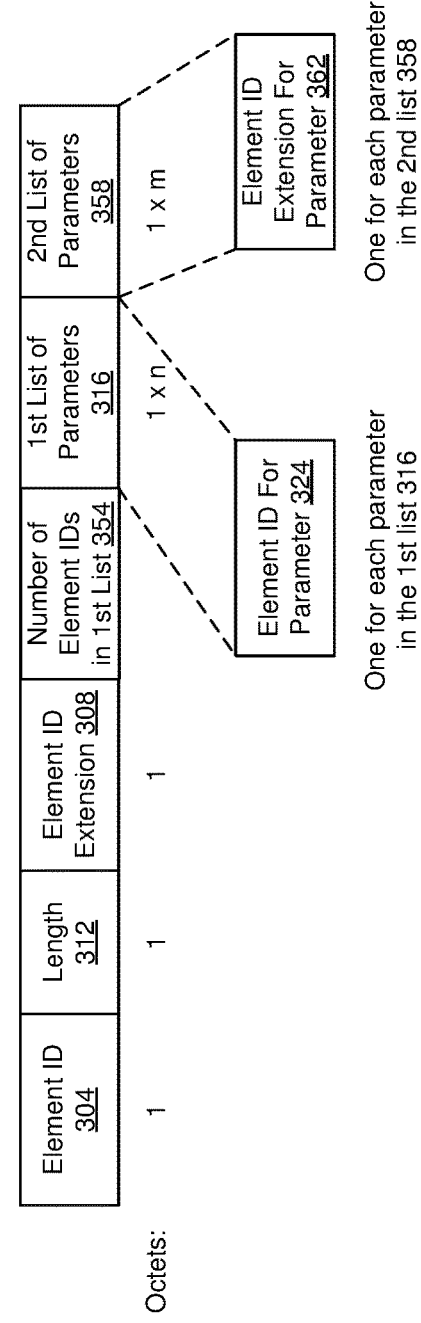

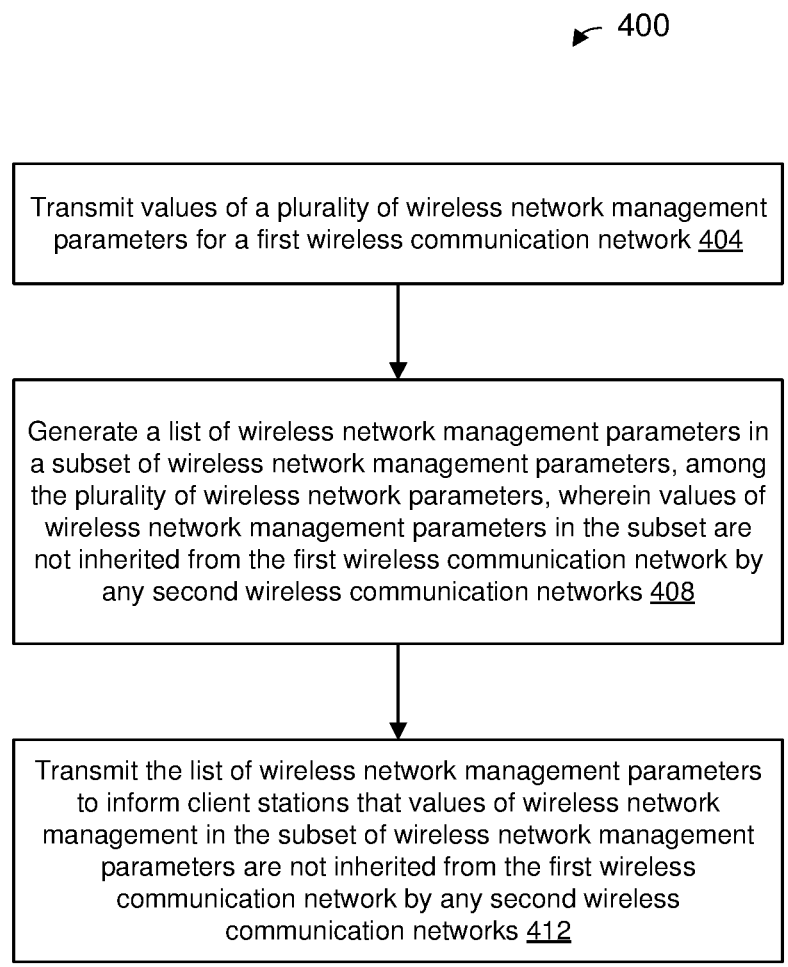

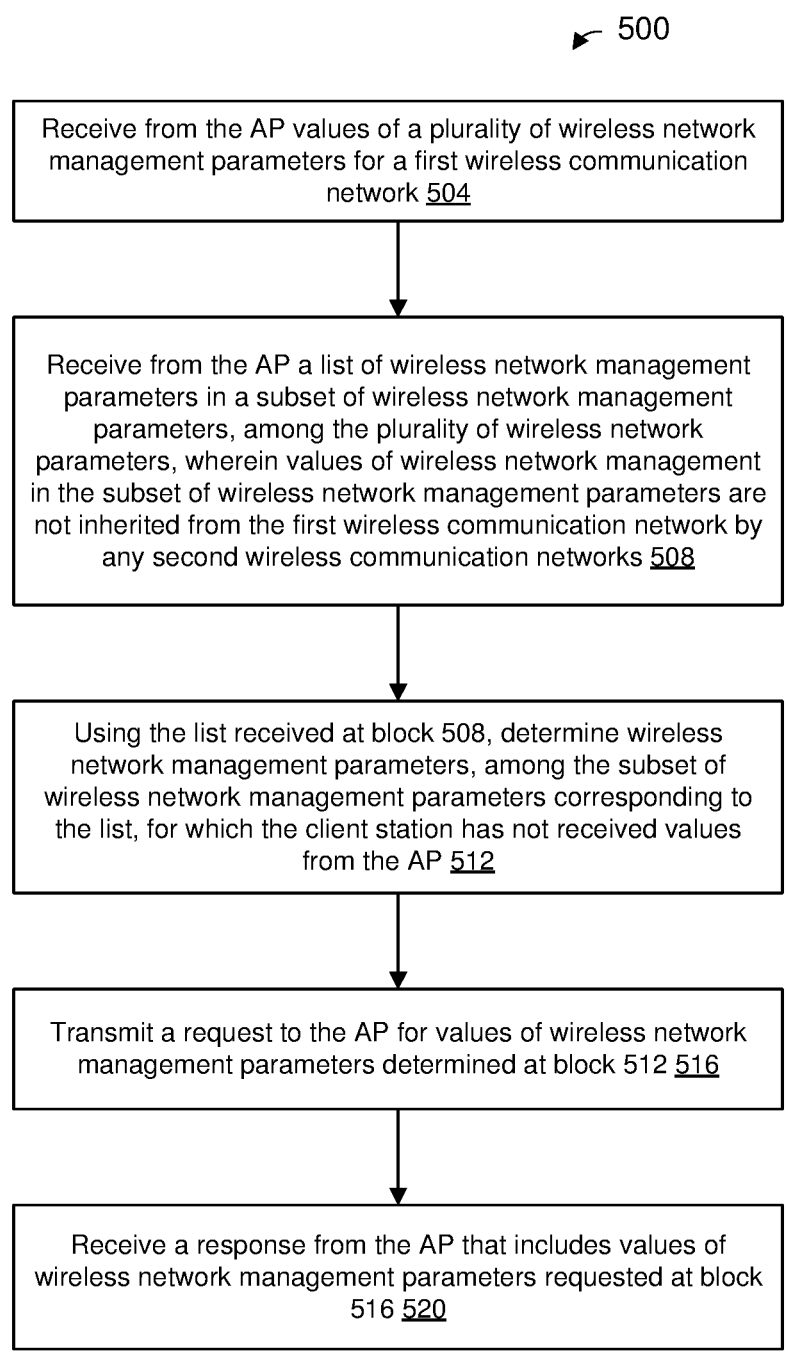

COMMUNICATING NETWORK MANAGEMENT PARAMETERS IN A WLAN

CROSS REFERENCES TO RELATED APPLICATIONS

This application claims the benefit of U.S. Provisional Patent Application No. 62/712,086, entitled "Noninhabitted Element Announcement for Multiple Basic Service Set Identification (BSSID)," filed on Jul. 30, 2018, and U.S. Provisional Patent Application No. 62/721,432, entitled "Noninhabitted Element Announcement for Multiple Basic Service Set Identification (BSSID)," filed on Aug. 22, 2018, both of which are hereby incorporated herein by reference in their entireties.

FIELD OF TECHNOLOGY

The present disclosure relates generally to wireless communication systems, and more particularly to communication of wireless local area network (WLAN) management parameters in a WLAN.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. More recent versions of the IEEE 802.11 Standard permit a single physical access point (AP) of a WLAN to operate as multiple virtual APs each managing a distinct wireless communication sub-network. Different virtual APs often operate according to different sets of network parameter values, which need to be communicated to client stations in the various wireless communication sub-networks. The communication of different values of the same network management parameter for different virtual APs increases overhead and complexity.

SUMMARY

In an embodiment, a method is for communicating management information in a plurality of wireless communication sub-networks managed by a physical access point, wherein the plurality of wireless communication sub-networks includes a first wireless communication sub-network and one or more second wireless communication sub-networks. The method includes: transmitting, by the physical access point, values of a plurality of wireless network management parameters for the first wireless communication sub-network to inform one or more client stations of the values of the plurality of wireless network management parameters for the first wireless communication sub-network; generating, at the physical access point, a list of wireless network management parameters in a subset of wireless network management parameters, among the plurality of wireless network parameters, wherein values of the wireless network management in the subset are not inherited from the first wireless communication sub-network by any of the one or more second wireless communication sub-networks; and transmitting, by the physical access point, the list to inform the one or more client stations that values of the wireless network management in the subset are not inherited from the first wireless communication sub-network by any of the one or more second wireless communication sub-networks.

In another embodiment, an access point manages a plurality of wireless communication sub-networks, wherein the plurality of wireless communication sub-networks includes a first wireless communication sub-network and one or more second wireless communication sub-networks. The access point comprises: a network interface device having one or more integrated circuit (IC) devices. The one or more IC devices are configured to: control the network interface device to transmit values of a plurality of wireless network management parameters for the first wireless communication sub-network to inform one or more client stations of the values of the plurality of wireless network management parameters for the first wireless communication sub-network; generate a list of wireless network management parameters in a subset of wireless network management parameters, among the plurality of wireless network parameters, wherein values of the wireless network management in the subset are not inherited from the first wireless communication sub-network by any of the one or more second wireless communication sub-networks; and control the network interface device to transmit the list to inform the one or more client stations that values of the wireless network management in the subset are not inherited from the first wireless communication sub-network by any of the one or more second wireless communication sub-networks.

In yet another embodiment, a method is for obtaining management information for a plurality of wireless communication sub-networks managed by a physical access point. The method includes: receiving, at a client station, network management parameters for a subset of the plurality of wireless communication sub-networks from the physical access point; determining, at the client station, one or more wireless communication sub-networks for which the client station did not receive network management parameters; generating, at the client station, a bitmap that indicates the one or more wireless communication sub-networks for which the client station did not receive network management parameters; transmitting, by the client station, the bitmap to the physical access point to inform the physical access point of the one or more wireless communication sub-networks for which the client station did not receive network management parameters; and in response to transmitting the bitmap, receiving, at the client station, network management parameters for the one or more wireless communication sub-networks indicated by the bitmap as having not been received by the client station.

In still another embodiment, a client station comprises: a network interface device having one or more IC devices that are configured to: receive network management parameters for a subset of a plurality of wireless communication sub-networks managed by a physical access point, the management parameters for the subset having been received by the network interface device from the physical access point; determine one or more wireless communication sub-networks for which the client station did not receive network management parameters; generate a bitmap that indicates the one or more wireless communication sub-networks for which the client station did not receive network management parameters; control the network interface device to transmit the bitmap to the physical access point to inform the physical access point of the one or more wireless communication sub-networks for which the client station did not receive network management parameters; and receive network management parameters for the one or more wireless communication sub-networks indicated by the bitmap as having not been received by the client station, the network management parameters for the one or more wireless communication sub-networks having been receive by the network interface device from the physical access point in response to the network interface device transmitting the bitmap to the physical access point.

BRIEF DESCRIPTION OF THE DRAWINGS

FIG. 3A is a diagram of an example information element (IE) that includes a list of wireless network management parameters and that is transmitted by the AP of FIG. 1, according to an embodiment.

FIG. 3B is a diagram of another example IE that includes a list of wireless network management parameters and that is transmitted by the AP of FIG. 1, according to another embodiment.

FIG. 4 is a flow diagram of an example method for communicating wireless network management parameters in a WLAN, according to an embodiment.

FIG. 5 is a flow diagram of an example method for determining wireless network management parameters in a WLAN, according to an embodiment.

DETAILED DESCRIPTION

Figure 1:
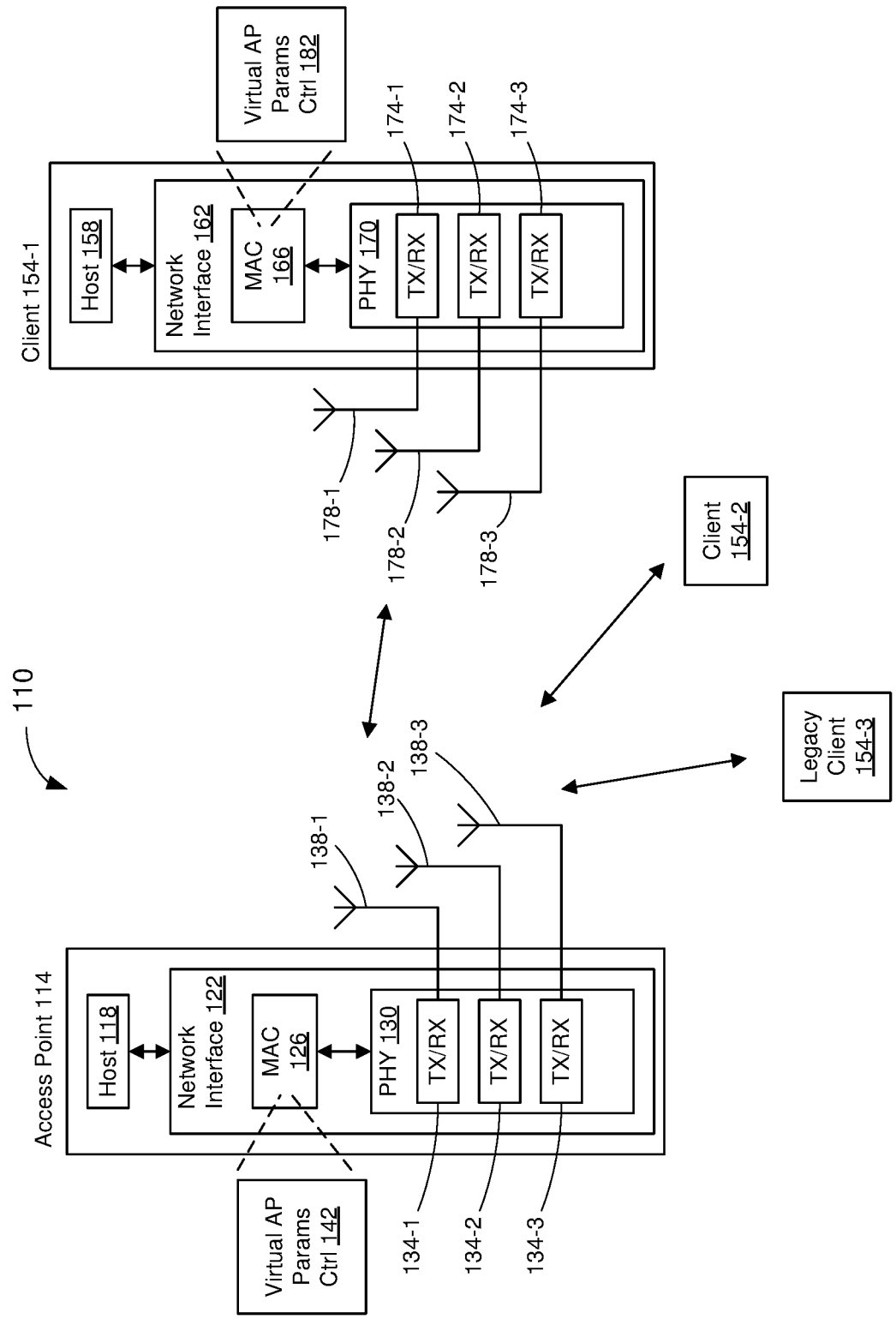
FIG. 1 is a block diagram of an example wireless local area network (WLAN) in which a single physical access point (AP) manages multiple wireless sub-networks, according to an embodiment.

The IEEE 802.11 Standard communication protocol permits a single physical access point (AP) of a wireless local area network (WLAN) to operate as multiple virtual APs each managing a distinct wireless communication sub-network (referred to by the IEEE 802.11 Standard as a "basic service set" or "BSS"), where all of the sub-networks operate within the same communication sub-channel or set of communication sub-channels. Each sub-network has a respective identifier (ID), which is referred to by the IEEE 802.11 Standard as a "BSSID". The feature of a single physical AP operating multiple sub-networks with respective BSSIDs is sometimes referred to by the IEEE 802.11 Standard as "multiple BSSID".

The single physical AP occasionally transmits wireless network management information to inform client stations of various wireless network management parameters associated with wireless communications in the BSS(s) managed by the single physical AP. For example, the AP periodically transmits a beacon frame that includes wireless network management parameters. As another example, the AP transmits a probe response frame to a client station in response to receiving a probe request frame from the client station, where the probe response frame includes wireless network management parameters. As another example, the AP transmits an association response frame to a client station in response to receiving an association request frame from the client station, where the association response frame includes wireless network management parameters. Illustrative examples of wireless network management parameters transmitted by the AP include: parameters related to capability information regarding the AP (e.g., supported modulation schemes, supported error correction coding rates, a maximum number of spatial streams supported, etc.), an identifier of (e.g., the BSSID, a BSS color ID, etc.) of the wireless network, a set of one or more communication sub-channels within which the wireless network operates, etc.

The IEEE 802.11 Standard specifies that only one of the virtual APs (in a multiple BSSID scenario) transmits beacon frames in the WLAN in order to reduce the amount of management traffic in the WLAN. The one virtual AP that transmits beacon frames is referred to in the IEEE 802.11 Standard as the "transmitted BSSID", whereas the other virtual APs are referred to as "nontransmitted BSSIDs". The beacon frames include values of network management parameters of the sub-network corresponding to the transmitted BSSID. The beacon frames also include values of some network management parameters of sub-networks corresponding to the nontransmitted BSSIDs. According to the IEEE 802.11 Standard, values of network management parameters of sub-networks corresponding to the nontransmitted BSSIDs are included in "nontransmitted BSSID profiles" within a "multiple BSSID" information element, which may be included in a beacon frame.

According to the IEEE 802.11 Standard, values of at least some of the wireless network management parameters for the transmitted BSSID are inherited by the nontransmitted BSSIDs (i.e., the values of such parameters are the same for both the transmitted BSSID and the nontransmitted BSSIDs), whereas other values of other network management parameters for the nontransmitted BSSID are not inherited by the nontransmitted BSSIDs (i.e., the values of such parameters may be different than those for the transmitted BSSID). In a draft of the IEEE 802.11ax Standard, if a particular network management parameter of a nontransmitted BSSID is not clearly defined in a nontransmitted BSSID profile in a multiple BSSID information element (e.g., within a beacon frame), client stations will assume that a value of the particular network management parameter for the nontransmitted BSSID is inherited from the corresponding network management parameter of the transmitted BSSID.

In one aspect of the present disclosure, the single physical AP transmits a list of network management parameters that are not inherited from the one virtual AP (e.g., the transmitted BSSID) to allow client stations to easily identify which network management parameters are not inherited by the other virtual APs (e.g., the non-transmitted BSSIDs). In at least some embodiments, the list of network management parameters that are not inherited from the one virtual AP (e.g., the transmitted BSSID) assists a client station in ensuring that the client station determines the correct values of all of the network management parameters of the one virtual AP (e.g., the transmitted BSSID).

Sometimes, a client station may not receive network management parameters for all of the virtual APs. In another aspect of the present disclosure, a client station in a WLAN transmits to a single physical AP an explicit indication of the virtual APs for which the client station has received network management parameters, according to an embodiment. The explicit indication of the virtual APs for which the client station has received network management parameters assists the single physical AP in determining for which virtual APs the client station has not received network management parameters so that the single physical AP can transmit to the client station the network management parameters for those virtual APs, according to an embodiment.

FIG. 1 is a block diagram of an example WLAN 110, according to an embodiment. The WLAN 110 includes a physical AP 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The network interface device 122 is configured to operate multiple virtual APs each managing a distinct wireless communication sub-network, and where all of the sub-networks operate within the same communication sub-channel or set of communication sub-channels. Each sub-network has a respective ID (e.g., a BSSID or another suitable ID). The single physical AP 110 operating multiple sub-networks with respective BSSIDs is sometimes referred to herein as a "multiple BSSID" operation, and the multiple virtual APs are sometimes referred to herein as a "multiple BSSID set". In an embodiment, the network interface device 122 transmits beacon frames for only one of the virtual APs to reduce the amount of management traffic in the WLAN, and the one virtual AP that transmits beacon frames is sometimes referred to herein as the "transmitted BSSID", whereas other virtual APs are sometimes referred to herein as "nontransmitted BSSIDs". The beacon frames include values of network management parameters of the sub-network corresponding to the transmitted BSSID. The beacon frames also include values of some network management parameters of sub-networks corresponding to the nontransmitted BSSIDs. For example, values of network management parameters of sub-networks corresponding to the nontransmitted BSSIDs are included in nontransmitted BSSID profiles within a multiple BSSID information element within a beacon frame. Values of some of the wireless network management parameters for the transmitted BSSID are inherited by the nontransmitted BSSIDs (i.e., the values of such parameters are the same for both the transmitted BSSID and the nontransmitted BSSIDs), whereas other values of other network management parameters for the nontransmitted BSSID are not inherited by the nontransmitted BSSIDs (i.e., the values of such parameters may be different than those for the transmitted BSSID). For example, values for network management parameters included in a nontransmitted BSSID profile for a nontransmitted BSSID are not inherited. However, there may be additional network management parameters that are not included in the nontransmitted BSSID profile but for which the nontransmitted BSSID does not intend for values to be inherited from the transmitted BSSID. Thus, a list of non-inherited network management parameters is provided to client stations so that the client stations are aware of all network management parameters for which nontransmitted BSSIDs do not intend for values to be inherited from the transmitted BSSID, as will be described in more detail below.

The MAC processor 126 includes, or implements, a virtual AP parameter controller 142. As will be described in more detail below, the virtual AP parameter controller 142 generates information elements (IEs) and/or MPDUs that include network management parameters of the virtual APs implemented by the physical AP 114, and prompts the PHY processor 130 to transmit the IEs and/or MPDUs so that client stations in the WLAN 110 are informed of the network management parameters of the virtual APs. In an embodiment, the virtual AP parameter controller 142 generates an IE and/or an MPDU that includes a list of network management parameters that are not inherited from one virtual AP (e.g., the transmitted BSSID) to allow client stations to easily identify which network management parameters are not inherited by other virtual APs (e.g., the non-transmitted BSSIDs), and prompts the PHY processor 130 to transmit the IE and/or the MPDU.

In another embodiment, the virtual AP parameter controller 142 generates an IE and/or an MPDU that includes an indication of the virtual APs operated by the physical AP 114, and prompts the PHY processor 130 to transmit the IE and/or MPDU to assist a client station in the WLAN 110 in determining which virtual APs the client station has not received network management parameters for so that the client station can request the AP to transmit the network management parameters for those virtual APs. In another embodiment, the virtual AP parameter controller 142 additionally or alternatively receives an IE and/or an MPDU transmitted by a client station, where the IE and/or MPDU includes an indication of the virtual APs that the client station has not received network management parameters for; and the virtual AP parameter controller 142 then uses the indication to determine a set of network management parameters that are to be transmitted to the client station.

In an embodiment, the virtual AP parameter controller 142 is implemented by a processor executing machine readable instructions stored in a memory, where the machine readable instructions cause the processor to perform acts, as described in more detail below, in connection with generation and/or transmission of information, IEs, MPDUs, etc., related to informing client stations of virtual APs operated by the physical AP 114 and/or network parameters for such virtual APs. In another embodiment, the virtual AP parameter controller 142 additionally or alternatively comprises one or more hardware state machines that are configured to perform acts, as described in more detail below, in connection with generation and/or transmission of information, IEs, MPDUs, etc., related to informing client stations of virtual APs operated by the physical AP 114 and/or network parameters for such virtual APs.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 seen at client station 154-1 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 seen at client station 154-1 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 seen at client station 154-1 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1 for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a virtual AP parameter controller 182. As will be described in more detail below, the virtual AP parameter controller 182 receives from the AP 114 IEs and/or MPDUs that include network management parameters of the virtual APs implemented by the physical AP 114, and configures the network interface 162 to operate according to the received network management parameters. In an embodiment, the virtual AP parameter controller 182 receives from the AP 114 an IE and/or an MPDU that includes a list of network management parameters that are not inherited from one virtual AP (e.g., the transmitted BSSID) to allow the network interface device 162 to easily identify which network management parameters are not inherited by other virtual APs (e.g., the non-transmitted BSSIDs); and the MAC processor 166 uses the list of network management parameters to determine which network management parameters of the one virtual AP (e.g., the transmitted BSSID) are not inherited by other virtual APs (e.g., the non-transmitted BSSIDs). In an embodiment, the virtual AP parameter controller 182 generates an MPDU that includes a request for values of at least some of the network management parameters that are not inherited by other virtual APs (e.g., the non-transmitted BSSIDs), and prompts the PHY processor 170 to transmit the MPDU to the AP 114.

In another embodiment, the virtual AP parameter controller 182 additionally or alternatively receives an IE and/or an MPDU transmitted by the AP 114, where the IE and/or MPDU includes an indication of the virtual APs that the physical AP 114 is implementing; and the virtual AP parameter controller 182 then uses the explicit indication to determine a set of network management parameters to request from the AP 114.

In another embodiment, the virtual AP parameter controller 182 generates an IE and/or an MPDU that includes an indication of the virtual APs for which the client station 154 has received network management parameters, and prompts the PHY processor 130 to transmit the IE and/or MPDU to inform the AP 114 of the network management parameters, if any, that the client station 154 has not yet received. The AP 114 may then, in response, transmit the network management parameters, if any, that the client station 154 did not previously receive.

In an embodiment, the virtual AP parameter controller 182 is implemented by a processor executing machine readable instructions stored in a memory, where the machine readable instructions cause the processor to perform acts, as described in more detail below, in connection with the processing of information, IEs, MPDUs, etc., related to which virtual APs are operated by the physical AP 114 and/or the values of network parameters for such virtual APs. In another embodiment, the virtual AP parameter controller 182 additionally or alternatively comprises one or more hardware state machines that are configured to perform acts, as described in more detail below, in connection with the processing of information, IEs, MPDUs, etc., related to which virtual APs are operated by the physical AP 114 and/or the values of network parameters for such virtual APs.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
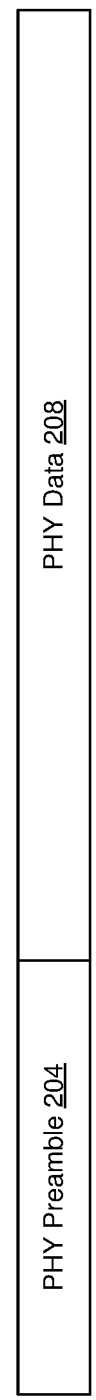
FIG. 2A is a block diagram of an example physical layer (PHY) data unit transmitted by communication devices in the WLAN of FIG. 1, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. If the PPDU is transmitted by a client station 154, the network interface device 122 (FIG. 1) is also configured to receive and process the PPDU 200, according to an embodiment.

The network interface device 162 (FIG. 1) is also be configured to generate and transmit the PPDU 200 to the AP 114, according to an embodiment. If the PPDU is transmitted by the AP 114, the network interface device 162 (FIG. 1) is also configured to receive and process the PPDU 200, according to an embodiment.

The PPDU 200 may occupy a 20 MHz bandwidth or another suitable bandwidth. Data units similar to the PPDU 200 occupy other suitable bandwidths that correspond to an aggregation of multiple sub-channels (e.g., each having a 20 MHz bandwidth or another suitable bandwidth), in other embodiments.

The PPDU 200 includes a PHY preamble 204 and a PHY data portion 208. The PHY data portion 208 may include a single MPDU, or may include an aggregated MPDU (A-MPDU) comprising of a plurality of MPDUs.

In an embodiment, the PPDU 200 is a single-user (SU) PHY data unit transmitted by one of the client stations 154 to the AP 114, or transmitted by the AP 114 to one of the client station 154. In another embodiment, the PPDU 200 is a downlink multi-user (MU) PHY data unit in which the AP transmits independent data streams to multiple client stations 154 using respective sets of OFDM tones and/or spatial streams allocated to the client stations 154. In another embodiment, the PPDU 200 is an uplink MU PHY data unit in which the multiple client stations simultaneously transmit independent data streams to the AP 114 using respective sets of OFDM tones and/or spatial streams allocated to the client stations 154.

Figure 2B:
FIG. 2B is a block diagram of an example media access control layer (MAC) data unit that is included in the example PHY data unit of FIG. 2A, according to an embodiment.

FIG. 2B is a diagram of an example MPDU 250 that the network interface device 122 (FIG. 1) is configured to generate and transmit to one or more client stations 154 (e.g., the client station 154-1), according to an embodiment. If the MPDU 250 is transmitted by a client station 154, the network interface device 122 (FIG. 1) is also configured to receive and process the MPDU 250, according to an embodiment.

The network interface device 162 (FIG. 1) is also configured to generate and transmit the MPDU 250 to the AP 114, according to an embodiment. If the MPDU 250 is transmitted by the AP 114, the network interface device 162 (FIG. 1) is also configured to receive and process the MPDU 250, according to an embodiment.

In an embodiment, the MPDU 250 is included in a PPDU, such as the PPDU 200 of FIG. 2A, for wireless transmission in the WLAN 110.

The MPDU 250 includes a MAC header 254 and a MAC data portion 258. In some embodiments, network management parameter information is included in the MAC data portion 258. In some embodiments and/or scenarios, the MAC data portion 258 is omitted, and network management parameter information is included in the MAC header 254.

Referring again to FIG. 1, the physical AP 114 periodically transmits a beacon frame that includes wireless network management parameters. As another example, the AP 114 transmits a probe response frame to a client station 154 in response to receiving a probe request frame from the client station 154, where the probe response frame includes wireless network management parameters. As another example, the AP 114 transmits an association response frame to a client station 154 in response to receiving an association request frame from the client station 154, where the association response frame includes wireless network management parameters. A frame carrying network management parameters such as a beacon frame, a probe response frame, etc., may have a format the same as or similar to the MPDU 250 discussed with reference to FIG. 2B, and may be transmitted within a PPDU such as the PPDU 200 of FIG. 2A.

A beacon frame may include values of network management parameters for one virtual AP (e.g., the transmitted BSSID). The values of some of the network management parameters for the one virtual AP (e.g., the transmitted BSSID) are inherited by other virtual APs (e.g., non-transmitted BSSIDs), and these network management parameters are sometimes referred to herein as "inherited parameters". In other words, the values of inherited parameters are the same for all of the virtual APs. On the other hand, values of other ones of the network management parameters for the one virtual AP (e.g., the transmitted BSSID) are different for other virtual APs (e.g., non-transmitted BSSIDs), and these network management parameters are sometimes referred to herein as "noninherited parameters".

Illustrative examples of wireless network management parameters transmitted by the AP include: parameters related to capability information regarding the AP (e.g., supported modulation schemes, supported error correction coding rates, a maximum number of spatial streams supported, etc.), an identifier of (e.g., the BSSID, a BSS color ID, etc.) of the wireless network, a set of one or more communication sub-channels within which the wireless network operates, etc.

An individual beacon may only include values of network management parameters for the one virtual AP (e.g., the transmitted BSSID), or may include values of noninherited network management parameters for only some of the other virtual APs (e.g., non-transmitted BSSIDs). Thus, upon receiving one or more beacon frames, a particular client station 154 may not be able to determine whether the client station 154 received values of all of the noninherited network management parameters needed by the client station 154.

To assist a client station 154 in determining whether the client station 154 has received values of all of the noninherited network management parameters needed by the client station 154, the physical AP 114 (e.g., the transmitted BSSID operated by the physical AP 114) transmits a list of non-inherited network management parameters. In at least some embodiments, the list of non-inherited network management parameters assists a client station in ensuring that the client station has obtained the correct values of the non-inherited network management parameters needed by the client station.

FIG. 3A is a diagram of an example IE 300 for transmitting a list of non-inherited network management parameters, according to an embodiment. The IE 300 is generated by the virtual AP parameters controller 142, according to an embodiment. The MAC processor 126 includes the IE 300 in a beacon frame and prompts the PHY processor 130 to transmit the beacon frame, according to an embodiment. The MAC processor 126 includes the IE 300 in another suitable frame (e.g., a probe response frame, etc.) and prompts the PHY processor 130 to transmit the frame, according to another embodiment.

Although example lengths of fields of the IE 300 are illustrated in FIG. 3A, other suitable lengths are used in other embodiments. Additionally, fields are arranged in a different suitable manner, additional fields are included, and/or one or more of the illustrated fields are omitted, in various embodiments.

The IE 300 includes an element ID field 304 and an element ID extension field 308 whose values together identify the IE 300 as having a particular format (e.g., the format illustrated in FIG. 3A or another suitable format) and including a list of non-inherited network management parameters, according to an embodiment. In another embodiment, the element ID extension field 308 is omitted, and the value of the element ID field 304 alone identifies the IE 300 as having the particular format and including the list of non-inherited network management parameters.

The IE 300 also includes a length field 312 set to indicate a length of the IE 300. The IE 300 further includes a first list 316 of one or more network management parameters that are not inherited by non-transmitted BSSIDs. The IE 300 also includes a second list 320 of one or more network management parameters that are not inherited by non-transmitted BSSIDs.

The first list 316 includes n element ID fields 324 that respectively indicate n network management parameters that are not inherited by non-transmitted BSSIDs, where n is a suitable positive integer. In an embodiment in which an element ID field can have at most a maximum value (e.g., 255 or another suitable maximum value), the first list 316 includes only element ID fields 324 with values less than the maximum value.

The second list 320 includes m pairs of element ID fields 328 and element ID extension fields 332 that together respectively indicate m network management parameters that are not inherited by non-transmitted BSSIDs, where m is a suitable positive integer. In an embodiment in which an element ID field can have at most a maximum value (e.g., 255 or another suitable maximum value), the second list 316 includes only element ID fields having the maximum value, and the element ID extension fields 332 indicate different network management parameters.

FIG. 3B is a diagram of another example IE 350 for transmitting a list of non-inherited network management parameters, according to an embodiment. The IE 350 is generated by the virtual AP parameters controller 142, according to an embodiment. The MAC processor 126 includes the IE 350 in a beacon frame and prompts the PHY processor 130 to transmit the beacon frame, according to an embodiment. The MAC processor 126 includes the IE 350 in another suitable frame (e.g., a probe response frame, etc.) and prompts the PHY processor 130 to transmit the frame, according to another embodiment.

Although example lengths of fields of the IE 350 are illustrated in FIG. 3B, other suitable lengths are used in other embodiments. Additionally, fields are arranged in a different suitable manner, additional fields are included, and/or one or more of the illustrated fields are omitted, in various embodiments.

The IE 350 is similar to the IE 300 of FIG. 3A, and like-numbered elements are not discussed in detail for purposes of brevity.

The IE 350 includes a number of element IDs field 354 that indicates a number of element ID fields 324 in the first list 316 of parameters. For example, the number of element IDs field 354 is set to the value n, according to an embodiment. Similar to the example IE 300, in an embodiment in which an element ID field can have at most a maximum value (e.g., 255 or another suitable maximum value), the first list 316 includes only element ID fields 324 with values less than the maximum value. The number of element IDs field 354 has a suitable length such as 1, 2, 3, 4, 5, etc., octets, or less than eight bits.

The IE 300 also includes a second list 358 of one or more network management parameters that are not inherited by non-transmitted BSSIDs. The second list 358 includes m element ID extension fields 362 that respectively indicate m network management parameters that are not inherited by non-transmitted BSSIDs, where m is a suitable positive integer. In an embodiment in which an element ID field can have at most a maximum value (e.g., 255 or another suitable maximum value), the second list 358 corresponds to element ID fields having the maximum value, and the element ID extension fields 362 indicate different network management parameters. For example, in the second list 358, element IDs are assumed to be set to the maximum value, and thus the element ID fields need not be included in the second list 358.

Referring now to FIGS. 2A, 2B, 3A, and 3B, the AP 114 includes an IE such as the IE 300 and the IE 350 in an MPDU such as the MPDU 250, and the AP 114 transmits the MPDU in a PPDU such as the PPDU 200. In an embodiment, the AP 114 includes an IE such as the IE 300 and the IE 350 in the MAC header 254. In another embodiment, the AP 114 includes an IE such as the IE 300 and the IE 350 in the MAC data portion 258.

Referring now to FIGS. 1, 3A, and 3B, the physical AP 114 (e.g., the transmitted BSSID operated by the physical AP 114) transmits a list of non-inherited network management parameters. For example, the physical AP 114 (e.g., the transmitted BSSID operated by the physical AP 114) transmits the IE 300 in a beacon frame or another suitable frame (e.g., a probe response frame, etc.), according to an embodiment. As another example, the physical AP 114 (e.g., the transmitted BSSID operated by the physical AP 114) transmits the IE 350 in a beacon frame or another suitable frame (e.g., a probe response frame, etc.), according to an embodiment. Upon receiving the list of non-inherited network management parameters, a client station 154 determines non-inherited network management parameters, if any, for which the client station 154 has not received values. The client station 154 then (if appropriate) requests the physical AP 114 to transmit values of such non-inherited network management parameters. Alternatively, upon receiving the list of non-inherited network management parameters, a client station 154 determines non-inherited network management parameters, if any, needed by the client station and for which the client station 154 has not received values. The client station 154 then (if appropriate) requests the physical AP 114 to transmit values of such non-inherited network management parameters needed by the client station.

As an illustrative example, a multiuser enhanced distributed channel access (MU EDCA) parameter set element includes parameters that an AP uses to control enhanced distributed channel access (EDCA) from client stations. Assume that the transmitted BSSID transmits a beacon frame having the MU EDCA parameter set element, and a non-transmitted BSSID Profile of the beacon frame does not include an MU EDCA Parameter Set sub-element. If an IE 300/350 does not include the Element ID and Element ID Extension corresponding to the MU EDCA Parameter Set element, parameter values indicated in the MU EDCA Parameter Set element of the transmitted BSSID will be inherited by non-transmitted BSSID. On the other hand, if the IE 300/350 includes the Element ID and Element ID Extension corresponding to the MU EDCA Parameter Set element, parameter values indicated in the MU EDCA Parameter Set element of the transmitted BSSID will not be inherited by non-transmitted BSSID; rather the client station obtains EDCA-related parameter values for the non-transmitted BSSID from, for example, an MU EDCA parameter set element transmitted by the non-transmitted BSSID, according to an embodiment.

FIG. 4 is a flow diagram of an example method 400 for communicating management information in a plurality of wireless communication networks managed by a single physical access point, according to an embodiment. The method 400 is implemented by the AP 114 (FIG. 1), according to an embodiment, and the method 400 is discussed with reference to FIG. 1 for explanatory purposes. In other embodiments, the method 400 is implemented by another suitable wireless network interface device.

At block 404, the AP 114 transmits (e.g., the network interface device 122 transmits, the PHY processor 130 transmits, etc.) values of a plurality of wireless network management parameters for a first wireless communication network, among the plurality of wireless communication networks. In an embodiment, the first wireless communication network corresponds to the transmitted BSSID. In an embodiment, block 404 includes transmitting the values of the plurality of wireless network management parameters for the first wireless communication network in a beacon frame. In other embodiments, the values of the plurality of wireless network management parameters for the first wireless communication network are transmitted in another suitable frame such as a probe response frame, etc.

At block 408, the AP 114 generates (e.g., the network interface device 122 generates, the MAC processor 126 generates, the virtual AP parameters controller 142 generates, etc.) a list of wireless network management parameters among a subset of the plurality of wireless network management parameters, wherein values of the subset of parameters are not inherited from the first wireless communication network by any second wireless communication networks, among the plurality of wireless communication networks.

At block 412, the AP 114 transmits (e.g., the network interface device 122 transmits, the PHY processor 130 transmits, etc.) the list of wireless network management parameters in the subset of the wireless network management parameters to inform client stations that values of wireless network management in the subset of wireless network management parameters are not inherited from the first wireless communication network by any second wireless communication networks. In an embodiment, the method 400 includes the AP 114 generating (e.g., the network interface device 122 generating, the MAC processor 126 generating, the virtual AP parameters controller 142 generating, etc.) an MPDU that includes the list, and block 412 includes transmitting the MPDU within a PPDU. In an embodiment, the method 400 includes the AP 114 generating (e.g., the network interface device 122 generating, the MAC processor 126 generating, the virtual AP parameters controller 142 generating, etc.) an IE such as the IE 300 (FIG. 3A), the IE 350 (FIG. 3B), or another suitable IE that includes the list, and block 412 transmitting the IE within an MPDU (which is within a PPDU).

FIG. 5 is a flow diagram of an example method 500 for determining wireless network management parameters, according to an embodiment. The method 500 is implemented by the client station 154 (FIG. 1), according to an embodiment, and the method 500 is discussed with reference to FIG. 1 for explanatory purposes. In other embodiments, the method 500 is implemented by another suitable wireless network interface device.

At block 504, the client station 154 receives (e.g., the network interface device 162 receives, the PHY processor 170 receives, etc.) from the AP 114 values of a plurality of wireless network management parameters for a first wireless communication network, among a plurality of wireless communication networks managed by the AP 114. In an embodiment, the first wireless communication network corresponds to the transmitted BSSID. In an embodiment, block 504 includes receiving the values of the plurality of wireless network management parameters for the first wireless communication network in a beacon frame. In other embodiments, the values of the plurality of wireless network management parameters for the first wireless communication network are received in another suitable frame such as a probe response frame, etc.

At block 508, the client station 154 receives (e.g., the network interface device 162 receives, the PHY processor 170 receives, etc.) from the AP 114 a list of a subset of the plurality of wireless network management parameters for the first wireless communication network, wherein the list indicates that values of wireless network management in the subset are not inherited from the first wireless communication network by any second wireless communication networks. In an embodiment, block 508 includes receiving (e.g., the network interface device 122 receiving, the MAC processor 126 receiving, the virtual AP parameters controller 182 receiving, etc.) the list within an MPDU. In an embodiment, block 508 includes receiving (e.g., the network interface device 122 receiving, the MAC processor 126 receiving, the virtual AP parameters controller 182 receiving, etc.) the list within an IE such as the IE 300 (FIG. 3A), the IE 350 (FIG. 3B), or another suitable IE that includes the list.

At block 512, the client station 154 determines (e.g., the network interface device 162 determines, the MAC processor 166 determines, the virtual AP parameters controller 182 determines, etc.), using the list received at block 508, wireless network management parameters, among the subset of wireless network management parameters corresponding to the list, for which the client station 154 has not received values from the AP 114.

At block 516, the client station 154 transmits (e.g., the network interface device 162 transmits, the PHY processor 170 transmits, etc.) a request to the AP 114 for values of the wireless network management parameters determined at block 512 to have not been received by the client station 154. In an embodiment, the method 500 includes the client station 154 generating (e.g., the network interface device 162 generating, the MAC processor 166 generating, the virtual AP parameters controller 182 generating, etc.) an MPDU that includes the request, and block 516 includes transmitting the MPDU within a PPDU. In an embodiment, the MPDU corresponds to a probe request frame or another suitable frame.

At block 520, the client station 154 receives (e.g., the network interface device 162 receives, the PHY processor 170 receives, etc.) a response from the AP 114 that includes values of the wireless network management parameters requested by the client station 154 at block 516. In an embodiment, block 520 includes receiving the response in an MPDU that includes values of the wireless network management parameters requested by the client station 154 at block 516. In an embodiment, the MPDU corresponds to a probe response frame or another suitable frame.

As mentioned above, in another aspect of the present disclosure, a client station in a WLAN transmits to a single physical AP an indication of the virtual APs for which the client station has received network management parameters, according to an embodiment. The explicit indication of the virtual APs for which the client station has received network management parameters assists the single physical AP in determining for which virtual APs the client station has not received network management parameters so that the single physical AP can transmit to the client station the network management parameters for those virtual APs.

In an embodiment, the client station 154 uses a bitmap to indicate the wireless sub-networks (corresponding to virtual APs) for which the client station 154 has received network management parameters. For example, the bitmap includes bits corresponding to bit positions x within the bitmap, where each bit position x corresponds to a different wireless sub-network (and also corresponding to a different virtual AP). As an example, a bit in the bitmap is set to one to indicate that the client station 154 received network management parameters for the corresponding wireless sub-network, whereas the bit is set to zero to indicate that the client station 154 did not receive network management parameters for the corresponding wireless sub-network, or vice versa.

In an embodiment, each of the virtual APs is assigned a BSSID value that comprises A–b most significant bits (MSBs), and b least significant bits (LSBs), where A is suitable positive integer and b is another suitable positive integer smaller than A. In an embodiment, A is 48. In other embodiments, A is another suitable positive integer. In an embodiment, b is a parameter that indicates a maximum number of virtual APs supported by the physical AP 114. In an embodiment, the BSSIDs assigned to all of the virtual APs share a same value BSSID_MSB_REF for the A–b MSBs, but the b LSBs of the BSSIDs assigned to the virtual APs have different respective values. In an embodiment, one of the virtual APs is assigned zeros for all of the b LSBs, and all of the remaining virtual APs are assigned incrementing values of the b LSBs, i.e., the virtual APs are respectively assigned 0, 1, 2, 3, etc., for the b LSBs of the BSSID. The BSSID with the b LSBs set to zero may be referred to as BSSID_BASE. In an embodiment, a bit position x in the bitmap corresponds to the virtual AP (and the wireless sub-network corresponding to that virtual AP) that was assigned a BSSID equal to BSSID_BASE+x.

Figure 6:
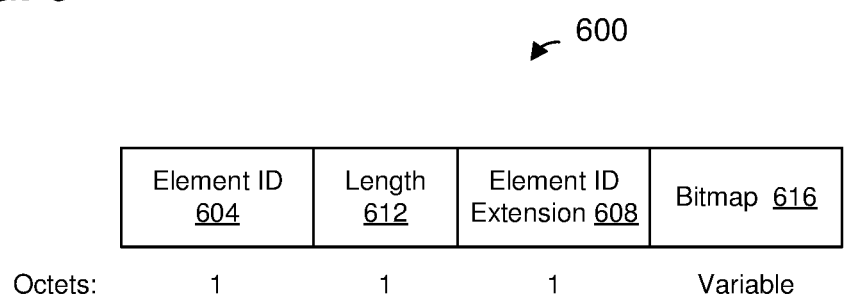
FIG. 6 is a diagram of an example IE for indicating wireless sub-networks for which a client station has received wireless network management parameters, according to an embodiment.

FIG. 6 is a diagram of an example IE 600 for indicating wireless sub-networks for which the client station 154 has received network management parameters, according to an embodiment. The IE 600 is generated by the virtual AP parameters controller 182, according to an embodiment. The MAC processor 166 includes the IE 600 in a probe request frame and prompts the PHY processor 170 to transmit the probe request frame, according to an embodiment. The MAC processor 166 includes the IE 600 in another suitable frame and prompts the PHY processor 170 to transmit the frame, according to another embodiment.

Although example lengths of fields of the IE 600 are illustrated in FIG. 6, other suitable lengths are used in other embodiments. Additionally, fields are arranged in a different suitable manner, additional fields are included, and/or one or more of the illustrated fields are omitted, in various embodiments.

The IE 600 includes an element ID field 604 and an element ID extension field 608 whose values together identify the IE 600 as having a particular format (e.g., the format illustrated in FIG. 6 or another suitable format) and including a bitmap that indicates wireless sub-networks (corresponding to virtual APs) for which the client station 154 has received network management parameters, according to an embodiment. In another embodiment, the element ID extension field 608 is omitted, and the value of the element ID field 604 alone identifies the IE 600 as having the particular format and including the bitmap that indicates wireless sub-networks for which the client station 154 has received network management parameters.

The IE 600 also includes a field 616 having the bitmap that indicates wireless sub-networks for which the client station 154 has received network management parameters. In an embodiment, a bit position x in the bitmap corresponds to the wireless sub-networks (and corresponding to the virtual AP) that was assigned a BSSID equal to BSSID_BASE+x. As an example, a bit in the bitmap is set to one to indicate that the client station 154 received network management parameters for the corresponding wireless sub-network, whereas the bit is set to zero to indicate that the client station 154 did not receive network management parameters for the corresponding wireless sub-network, or vice versa.

Figure 7:
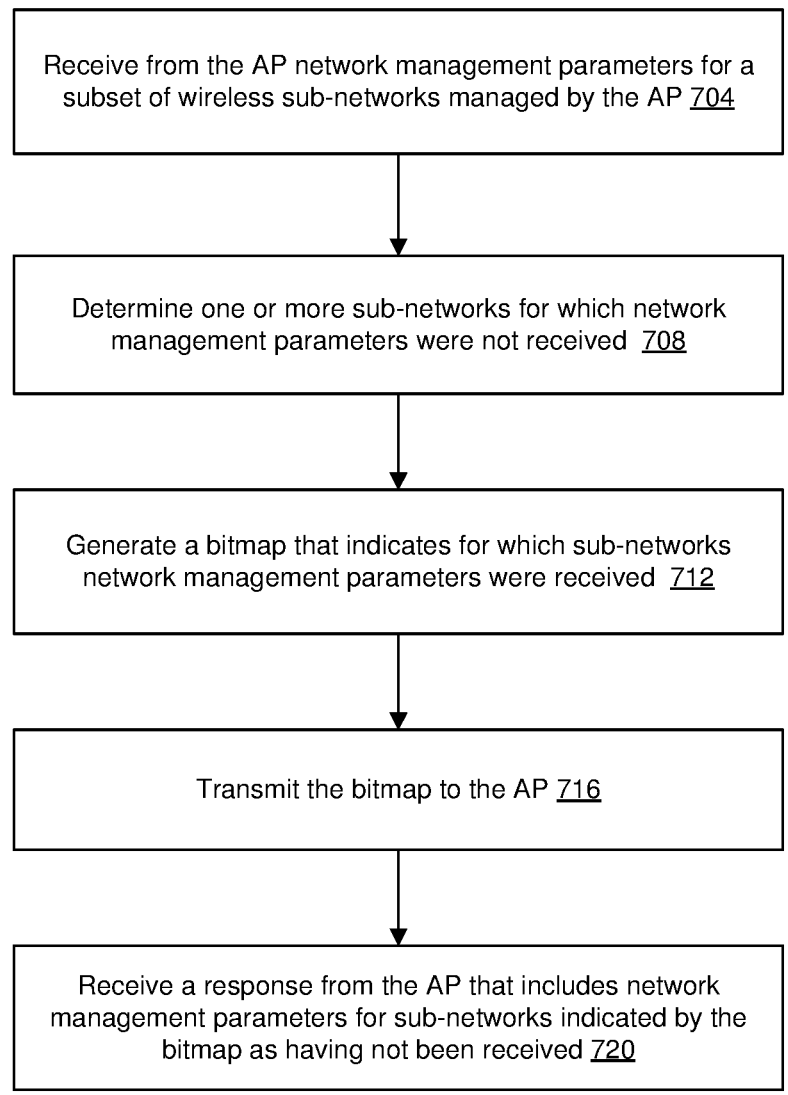
FIG. 7 is a flow diagram of another example method for determining wireless network management parameters in a WLAN, according to another embodiment.

FIG. 7 is a flow diagram of an example method 700 for obtaining wireless network management parameters, according to an embodiment. The method 700 is implemented by the client station 154 (FIG. 1), according to an embodiment, and the method 700 is discussed with reference to FIG. 1 for explanatory purposes. In other embodiments, the method 700 is implemented by another suitable wireless network interface device.

At block 704, the client station 154 receives (e.g., the network interface device 162 receives, the PHY processor 170 receives, etc.) from the AP 114 wireless network management parameters for a subset of wireless communication sub-networks managed by the single physical AP 114. In an embodiment, block 704 includes receiving wireless network management parameters in a beacon frame. In other embodiments, some or all of the wireless network management parameters are received in another suitable frame such as a probe response frame, etc.

At block 708, the client station 154 determines (e.g., the network interface device 162 determines, the MAC processor 166 determines, the virtual AP parameters controller 182 determines, etc.) one or more wireless sub-networks for which the client station 144 did not receive wireless network management parameters from the physical AP 114.

At block 712, the client station 154 generates (e.g., the network interface device 162 generates, the MAC processor 166 generates, the virtual AP parameters controller 182 generates, etc.) a bit map that indicates for which wireless sub-networks the client station 154 received wireless network management parameters. In an embodiment, the bitmap also indicates for which wireless sub-networks the client station 154 did not receive wireless network management parameters. In an embodiment, the bitmap includes bits corresponding to bit positions x within the bitmap, where each bit position x corresponds to a different virtual AP that manages a different wireless sub-network. In an embodiment, a bit position x in the bitmap corresponds to the virtual AP that was assigned a BSSID equal to BSSID_BASE+x, as discussed above. As an example, a bit in the bitmap is set to one to indicate that the client station 154 received network management parameters for the corresponding wireless sub-network, whereas the bit is set to zero to indicate that the client station 154 did not receive network management parameters for the corresponding wireless sub-network, or vice versa.

At block 716, the client station 154 transmits (e.g., the network interface device 162 transmits, the PHY processor 170 transmits, etc.) the bitmap to the AP 114 to inform the AP 114 of the wireless sub-networks for which the client station 154 received wireless network management parameters and the wireless sub-networks for which the client station 154 did not receive wireless network management parameters. In an embodiment, the method 700 includes the client station 154 generating (e.g., the network interface device 162 generating, the MAC processor 166 generating, the virtual AP parameters controller 182 generating, etc.) an MPDU that includes the bitmap, and block 716 includes transmitting the MPDU within a PPDU. In an embodiment, the MPDU corresponds to a probe request frame or another suitable frame. In an embodiment, the method 700 includes the client station 154 generating (e.g., the network interface device 162 generating, the MAC processor 166 generating, the virtual AP parameters controller 182 generating, etc.) the IE 600 or another suitable IE, and block 716 includes transmitting the bitmap within the IE 600 (which is within an MPDU, which is within a PPDU).

At block 720, the client station 154 receives (e.g., the network interface device 162 receives, the PHY processor 170 receives, etc.) a response from the AP 114 that includes wireless network management parameters for wireless sub-networks indicated by the bitmap (transmitted to the AP 114 at block 716) as having not been received by the client station 154. In an embodiment, block 720 includes receiving the response in an MPDU. In an embodiment, the MPDU corresponds to a probe response frame or another suitable frame.

In some embodiments, to help client station 154 to determine all of the wireless sub-networks being managed by the physical AP 114, the physical AP 114 transmits a bitmap that indicates the wireless sub-networks being managed by the physical AP 114. As an example, a bit in the bitmap is set to one to indicate that the corresponding wireless sub-network is active (e.g., the physical AP 114 is currently operating the sub-network), whereas the bit is set to zero to indicate that the corresponding wireless sub-network is not active (e.g., the corresponding sub-network is not currently operating), or vice versa.

Figure 8:
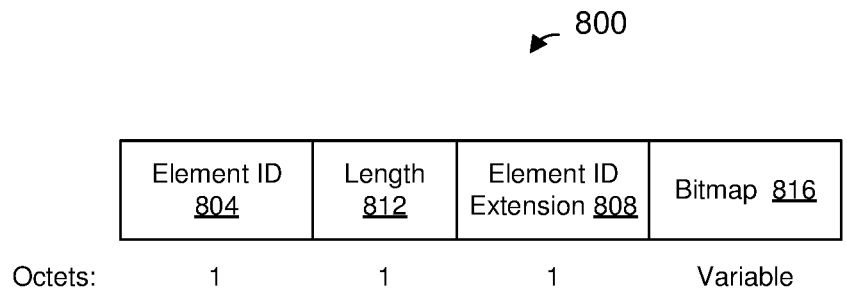
FIG. 8 is a diagram of an example IE for indicating wireless sub-networks being managed by a single physical AP, according to an embodiment.

For example, FIG. 8 is a diagram of an example IE 800 for indicating wireless sub-networks (corresponding to virtual APs) that are being operated by the physical AP 114, according to an embodiment. The IE 800 is generated by the virtual AP parameters controller 142, according to an embodiment. The MAC processor 126 includes the IE 800 in a beacon frame and prompts the PHY processor 130 to transmit the beacon frame (within a PPDU), according to an embodiment. The MAC processor 126 includes the IE 800 in another suitable frame and prompts the PHY processor 130 to transmit the frame (within a PPDU), according to another embodiment.

Although example lengths of fields of the IE 800 are illustrated in FIG. 8, other suitable lengths are used in other embodiments. Additionally, fields are arranged in a different suitable manner, additional fields are included, and/or one or more of the illustrated fields are omitted, in various embodiments.

The IE 800 includes an element ID field 804 and an element ID extension field 808 whose values together identify the IE 800 as having a particular format (e.g., the format illustrated in FIG. 8 or another suitable format) and including a bitmap that indicates wireless sub-networks (corresponding to virtual APs) being managed by the AP 114, according to an embodiment. In another embodiment, the element ID extension field 808 is omitted, and the value of the element ID field 804 alone identifies the IE 800 as having the particular format and including the bitmap that indicates wireless sub-networks (corresponding to virtual APs) being managed by the AP 114.

The IE 800 also includes a field 816 having the bitmap that indicates wireless sub-networks (corresponding to virtual APs) operated by the AP 114. In an embodiment, a bit position x in the bitmap corresponds to the wireless sub-network (and to the virtual AP) that was assigned a BSSID equal to BSSID_BASE+x. As an example, a bit in the bitmap is set to one to indicate that the corresponding wireless sub-network is active (e.g., the physical AP 114 is currently operating the sub-network), whereas the bit is set to zero to indicate that the corresponding wireless sub-network is not active (e.g., the corresponding sub-network is not currently operating), or vice versa.

Figure 9:
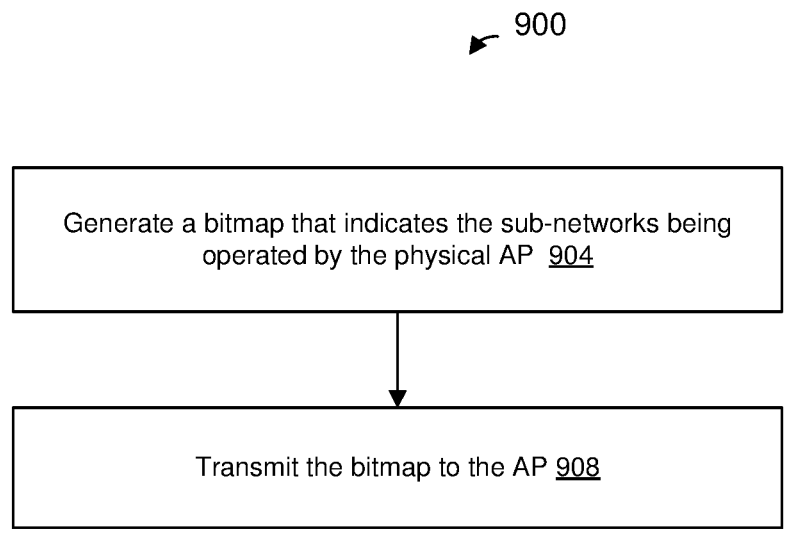
FIG. 9 is a flow diagram of an example method for identifying to client stations a plurality of communication sub-networks managed by a single physical access point, according to an embodiment.

FIG. 9 is a flow diagram of an example method 900 for identifying to client stations a plurality of communication sub-networks managed by a single physical access point, according to an embodiment. The method 900 is implemented by the AP 114 (FIG. 1), according to an embodiment, and the method 900 is discussed with reference to FIG. 1 for explanatory purposes. In other embodiments, the method 900 is implemented by another suitable wireless network interface device.

At block 904, the AP 114 generates (e.g., the network interface device 122 generates, the MAC processor 126 generates, the virtual AP parameters controller 142 generates, etc.) a bit map that indicates wireless sub-networks (corresponding to virtual APs) being managed by the AP 114, according to an embodiment. In an embodiment, the bitmap includes bits corresponding to bit positions x within the bitmap, where each bit position x corresponds to a different virtual AP that manages a different wireless sub-network. In an embodiment, a bit position x in the bitmap corresponds to the virtual AP that was assigned a BSSID equal to BSSID_BASE+x, as discussed above. As an example, a bit in the bitmap is set to one to indicate that the corresponding wireless sub-network is active (e.g., the physical AP 114 is currently operating the sub-network), whereas the bit is set to zero to indicate that the corresponding wireless sub-network is not active (e.g., the corresponding sub-network is not currently operating), or vice versa.

At block 908, the AP 114 transmits (e.g., the network interface device 122 transmits, the PHY processor 130 transmits, etc.) the bitmap to inform client stations 154 of the wireless sub-networks (corresponding to virtual APs) being operated by the AP 114. In an embodiment, the method 900 includes the AP 114 generating (e.g., the network interface device 122 generating, the MAC processor 126 generating, the virtual AP parameters controller 142 generating, etc.) an MPDU that includes the bitmap, and block 908 includes transmitting the MPDU within a PPDU. In an embodiment, the MPDU corresponds to a beacon frame, a probe response frame, or another suitable frame. In an embodiment, the method 900 includes the AP 114 generating (e.g., the network interface device 122 generating, the MAC processor 126 generating, the virtual AP parameters controller 142 generating, etc.) the IE 800, and block 908 includes transmitting the bitmap within the IE 800 (which is within an MPDU, which is within a PPDU).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating management information in a plurality of wireless communication sub-networks managed by a physical access point, wherein the plurality of wireless communication sub-networks includes a first wireless communication sub-network and one or more second wireless communication sub-networks, the method comprising:
   transmitting, by the physical access point, values of a plurality of wireless network management parameters for the first wireless communication sub-network to one or more client stations to inform the one or more client stations of the values of the plurality of wireless network management parameters for the first wireless communication sub-network;
   generating, at the physical access point, a list of wireless network management parameters from a subset of the plurality of wireless network management parameters,
   wherein certain values of the wireless network management parameters in the subset are not inherited from the first wireless communication sub-network by any of the one or more second wireless communication sub-networks; and
   transmitting, by the physical access point, the list to the one or more client stations to inform the one or more client stations that the certain values of the wireless network management parameters in the subset corresponding to wireless network management parameters in the list are not inherited from the first wireless communication sub-network by any of the one or more second wireless communication sub-networks.

2. The method for communicating management information of claim 1, further comprising:
   generating, at the physical access point, an information element to include the list of wireless network management parameters; and
   generating, at the physical access point, a media access control (MAC) layer data unit to include the information element;
   wherein transmitting the list includes transmitting a physical layer (PHY) data unit that includes the MAC layer data unit.

3. The method for communicating management information of claim 2, wherein generating the information element comprises:
   generating the information element to include one or more information element identification fields that indicate that the information element includes the list of wireless network management parameters.

4. The method for communicating management information of claim 2, wherein the list of wireless network management parameters comprises respective information element identifier information corresponding to respective wireless network management parameters.

5. The method for communicating management information of claim 2, wherein the MAC layer data unit comprises a beacon frame.

6. The method for communicating management information of claim 1, further comprising:
   receiving, at the physical access point, a packet from one of the client stations that corresponds to a request for values of wireless network management parameters in the subset for a second wireless communication sub-network; and
   in response to receiving the packet, transmitting, by the physical access point, the values of the wireless network management parameters in the subset for the second wireless communication sub-network.

7. An access point that manages a plurality of wireless communication sub-networks, wherein the plurality of wireless communication sub-networks includes a first wireless communication sub-network and one or more second wireless communication sub-networks, the access point comprising:
   a network interface device having one or more integrated circuit (IC) devices, wherein the one or more IC devices are configured to:
   control the network interface device to transmit values of a plurality of wireless network management parameters for the first wireless communication sub-network to one or more client stations to inform the one or more client stations of the values of the plurality of wireless network management parameters for the first wireless communication sub-network,
   generate a list of wireless network management parameters from a subset of the plurality of wireless network management parameters,
   wherein certain values of the wireless network management parameters in the subset are not inherited from the first wireless communication sub-network by any of the one or more second wireless communication sub-networks, and
   control the network interface device to transmit the list to the one or more client stations to inform the one or more client stations that the certain values of the wireless network management parameters in the subset corresponding to wireless network management parameters in the list are not inherited from the first wireless communication sub-network by any of the one or more second wireless communication sub-networks.

8. The access point of claim 7, wherein the one or more IC devices are further configured to:
   generate an information element to include the list of wireless network management parameters;
   generate a media access control (MAC) layer data unit to include the information element;
   generate a physical layer (PHY) data unit to include the MAC layer data unit; and
   control the network interface device to transmit the PHY data unit.

9. The access point of claim 8, wherein the one or more IC devices are further configured to:
   generate the information element to include one or more information element identification fields that indicate that the information element includes the list of wireless network management parameters.

10. The access point of claim 8, wherein the one or more IC devices are further configured to generate the list of wireless network management parameters to include respective information element identifier information corresponding to respective wireless network management parameters.

11. The access point of claim 8, wherein the MAC layer data unit comprises a beacon frame.

12. The access point of claim 7, wherein the one or more IC devices are further configured to, in response to receiving a packet from one of the client stations that corresponds to a request for values of wireless network management parameters in the subset for a second wireless communication sub-network:

control the network interface device to transmit the values of the wireless network management parameters in the subset for the second wireless communication sub-network.

13. A method for obtaining management information for a plurality of wireless communication sub-networks managed by a physical access point, the method comprising:
receiving, at a client station, first network management parameters for a subset of the plurality of wireless communication sub-networks from the physical access point;
determining, at the client station, one or more wireless communication sub-networks for which the client station did not receive second network management parameters;
generating, at the client station, a bitmap that indicates the one or more wireless communication sub-networks for which the client station did not receive the second network management parameters;
transmitting, by the client station, the bitmap to the physical access point to inform the physical access point of the one or more wireless communication sub-networks for which the client station did not receive the second network management parameters; and
in response to transmitting the bitmap, receiving, at the client station, the second network management parameters for the one or more wireless communication sub-networks indicated by the bitmap as having not been received by the client station.

14. The method for obtaining management information of claim 13, wherein:
the bitmap is generated to also indicate the subset of the plurality of wireless communication sub-networks for which the client station did receive the first network management parameters.

15. The method for obtaining management information of claim 14, wherein:
respective bits in the bitmap correspond to respective wireless communication sub-networks among the plurality of wireless communication sub-networks managed by the physical access point;
a first bit value of a respective bit indicates network management parameters for the respective wireless communication sub-network were received by the client station; and
a second bit value of the respective bit indicates network management parameters for the respective wireless communication sub-network were not received by the client station.

16. The method for obtaining management information of claim 14, further comprising:
generating, at the client station, an information element to include the bitmap; and
generating, at the client station, a media access control (MAC) layer data unit to include the information element;
wherein transmitting the bitmap includes transmitting a physical layer (PHY) data unit that includes the MAC layer data unit.

17. The method for obtaining management information of claim 16, wherein generating the information element comprises:
generating the information element to include one or more information element identification fields that indicate that the information element includes the bitmap.

18. The method for obtaining management information of claim 13, wherein:
the bitmap is a first bitmap;
the method further comprises: receiving, at the client station, a second bitmap from the physical access point, wherein the second bitmap indicates the plurality of wireless communication sub-networks being operated by the physical access point; and
determining the one or more wireless communication sub-networks for which the client station did not receive the second network management parameters includes using the second bitmap to determine the one or more wireless communication sub-networks for which the client station did not receive the second network management parameters.

19. The method for obtaining management information of claim 18, wherein:
respective bits in the second bitmap correspond to respective wireless communication sub-networks;
a first bit value of a respective bit in the second bitmap indicates the respective wireless communication sub-network is currently being operated by the physical access point; and
a second bit value of the respective bit indicates the respective wireless communication sub-network is not currently being operated by the physical access point.

20. The method for obtaining management information of claim 13, wherein receiving the first network management parameters for the subset of the plurality of wireless communication sub-networks includes receiving a beacon frame that includes the network management parameters for the subset of the plurality of wireless communication sub-networks.

21. A network interface device having one or more integrated circuit (IC) devices, wherein the one or more IC devices are configured to:
receive first network management parameters for a subset of a plurality of wireless communication sub-networks managed by a physical access point, the management parameters for the subset having been received by the network interface device from the physical access point,
determine one or more wireless communication sub-networks for which the client station did not receive second network management parameters,
generate a bitmap that indicates the one or more wireless communication sub-networks for which the client station did not receive the second network management parameters,
control the network interface device to transmit the bitmap to the physical access point to inform the physical access point of the one or more wireless communication sub-networks for which the client station did not receive the second network management parameters, and
receive the second network management parameters for the one or more wireless communication sub-networks indicated by the bitmap as having not been received by the client station, the second network management parameters for the one or more wireless communication sub-networks having been received by the network interface device from the physical access point in response to the network interface device transmitting the bitmap to the physical access point.

22. The network interface device of claim 21, wherein the one or more IC devices are further configured to:

generate the bitmap to also indicate the subset of the plurality of wireless communication sub-networks for which the client station did receive the first network management parameters.

23. The network interface device of claim 22, wherein:
respective bits in the bitmap correspond to respective wireless communication sub-networks among the plurality of wireless communication sub-networks managed by the physical access point;
a first bit value of a respective bit indicates network management parameters for the respective wireless communication sub-network were received by the client station; and
a second bit value of the respective bit indicates network management parameters for the respective wireless communication sub-network were not received by the client station.

24. The network interface device of claim 22, wherein the one or more IC devices are further configured to:
generate an information element to include the bitmap;
generate a media access control (MAC) layer data unit to include the information element;
generate a physical layer (PHY) data unit to include the MAC layer data unit; and
control the network interface device to transmit the PHY data unit.

25. The network interface device of claim 24, wherein the one or more IC devices are further configured to:
generate the information element to include one or more information element identification fields that indicate that the information element includes the bitmap.

26. The network interface device of claim 21, wherein:
the bitmap is a first bitmap; and
the one or more IC devices are further configured to:
receive, at the client station, a second bitmap from the physical access point, wherein the second bitmap indicates the plurality of wireless communication sub-networks being operated by the physical access point, and
determine the one or more wireless communication sub-networks for which the client station did not receive the second network management parameters using a second bitmap received from the physical access point, wherein the second bitmap indicates the plurality of wireless communication sub-networks being operated by the physical access point.

27. The network interface device of claim 26, wherein:
respective bits in the second bitmap correspond to respective wireless communication sub-networks;
a first bit value of a respective bit in the second bitmap indicates the respective wireless communication sub-network is currently being operated by the physical access point; and
a second bit value of the respective bit indicates the respective wireless communication sub-network is not currently being operated by the physical access point.

28. The network interface device of claim 21, wherein the one or more IC devices are further configured to:
receive the first network management parameters for the subset of the plurality of wireless communication sub-networks in a beacon frame transmitted by the physical access point.

* * * * *